(12) United States Patent
Klein

(10) Patent No.: US 10,776,507 B2
(45) Date of Patent: Sep. 15, 2020

(54) FINE-GRAINED SQL AUTHORIZATIONS

(71) Applicant: SAP SE, Walldorf (DE)

(72) Inventor: Udo Peter Klein, Nußloch (DE)

(73) Assignee: SAP SE, Walldorf (DE)

( * ) Notice: Subject to any disclaimer, the term of this patent is extended or adjusted under 35 U.S.C. 154(b) by 175 days.

(21) Appl. No.: 15/995,686

(22) Filed: Jun. 1, 2018

(65) Prior Publication Data

US 2019/0370484 A1   Dec. 5, 2019

(51) Int. Cl.
  *G06F 7/00*      (2006.01)
  *G06F 21/62*     (2013.01)
  *G06F 16/2455*   (2019.01)

(52) U.S. Cl.
  CPC ...... *G06F 21/6227* (2013.01); *G06F 16/2455* (2019.01)

(58) Field of Classification Search
  CPC .................................................. G06F 2221/21
  USPC ........................................................ 707/783
  See application file for complete search history.

(56) References Cited

U.S. PATENT DOCUMENTS

| | | | | |
|---|---|---|---|---|
| 6,643,648 | B1* | 11/2003 | Ross | G06F 21/6227 707/695 |
| 7,761,443 | B2* | 7/2010 | Bhaghavan | G06F 21/6218 707/708 |
| 7,882,132 | B2* | 2/2011 | Ghatare | G06F 16/258 707/783 |
| 2012/0078963 | A1* | 3/2012 | Dantzig | G06F 16/2343 707/783 |
| 2015/0256520 | A1* | 9/2015 | Maier | H04L 63/0428 713/168 |
| 2017/0091446 | A1* | 3/2017 | Bendel | G06F 21/629 707/707 |

* cited by examiner

*Primary Examiner* — Alexandia Y Bromell
(74) *Attorney, Agent, or Firm* — Sterne, Kessler, Goldstein & Fox P.L.L.C.

(57) ABSTRACT

Disclosed herein are system, method, and computer program product (computer-readable device) embodiments for implementing fine-grained SQL authorizations. An embodiment operates by determining, via a database query execution engine, that a database program unit may include a plurality of operations. Moreover, at least one first operation of the operations may correspond to a first privilege requirement, at least one second operation of the operations may correspond to a second privilege requirement, and the first privilege requirement may differ in scope from the second privilege requirement. Via the database query execution engine, the plurality of operations may be executed in accordance with each corresponding privilege requirement of each operation.

20 Claims, 4 Drawing Sheets

FINE-GRAINED SQL AUTHORIZATIONS

BACKGROUND

Some SQL databases may implement a concept of "roles" for dealing with privileges in a context of access control. A role typically bundles privileges, and may also include or inherit other roles. These roles may then be assigned to users, and a given user may consequently be able to act according to specific privileges specified by the roles assigned to that user. As databases and/or database management systems (DBMS) continue to evolve and implement more powerful programming and scripting capabilities, complications may arise in the specific implementations, resulting in added management overhead for implementers, developers, and/or administrators to consider and carry out, in order to avoid security vulnerabilities and/or mitigate risk and extent of potential data leaks, compromises, and/or other unauthorized access to access-restricted data stored in particular database(s).

Database scripting language(s) may be leveraged to implement program units, e.g., blocks, stored procedures (SP), etc., within a DBMS. These database program units may be subject to some authorization constraint(s). Some typical constraints may be for "definer" or "caller" in some examples. With definer or caller constraints, a given SP may be executed with roles of either the definer of the procedure or the caller of the procedure, respectively. Although this may suffice for some circumstances, implementation of such coarse constraints may also subtly introduce insidious security vulnerabilities into the DBMS.

For example, a block or SP may require some kind of "generic" access to a database, specifically at a part of the database that is not directly accessible by the caller of the unit. A conventional solution may be to define the SP with "definer" privileges, and to ensure that the definer of the SP then has sufficiently far-reaching privileges. More complicated examples may involve several SPs, each having different privilege requirements. Developers thus may often cluster all required privileges in just one role to be reused with multiple SPs. This may in turn let any such SP be executed with more privileges than it actually needs. As a result, this kind of design may increase the attack surface of a DBMS for SQL injection attacks, and may decrease confinement of SQL-injection security breaches, potentially exposing large amounts of sensitive data to unauthorized users or other unintended parties.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing fine-grained SQL authorizations. More specifically, in some embodiments, the fine-grained SQL authorizations described herein may further relate to enhanced techniques of stored procedure (SP) implementation within a database management system (DBMS).

Figure 1:
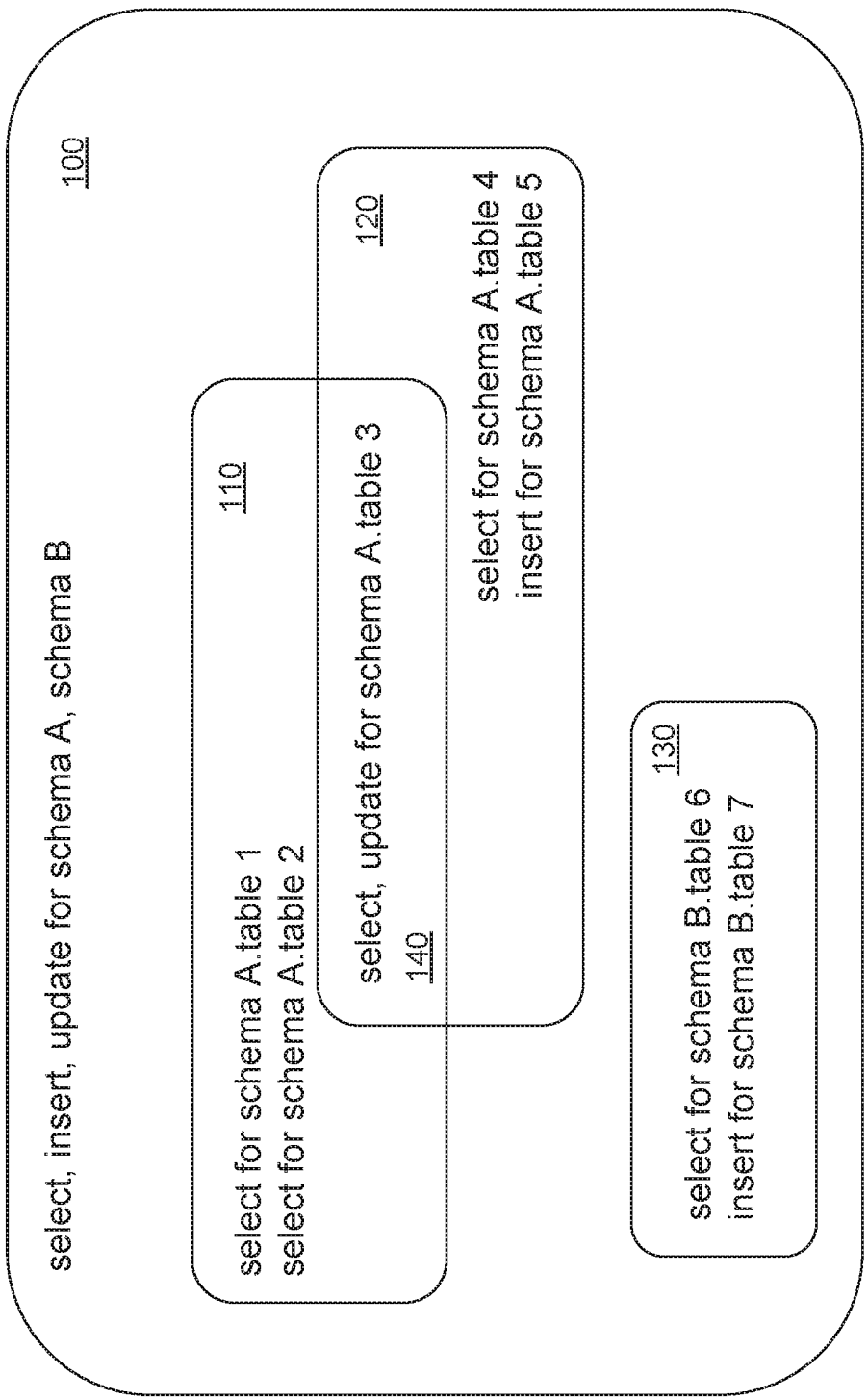
FIG. 1 is a diagram of an example program unit that includes multiple operations spanning multiple privilege requirements, according to some embodiments.

One non-limiting example of a particular SP that may benefit from the enhanced techniques described herein is depicted in the example of FIG. 1. An accompanying description of FIG. 1 follows in the paragraphs below.

FIG. 1 is a diagram of one example of a program unit that includes multiple operations spanning multiple privilege requirements, according to some embodiments. Specifically, shown here is a diagram of a stored procedure (SP), showing constituent operations of the SP, grouped by their respective privilege requirements with respect to specific database tables.

More specifically, SP 100 may include operations such as select, insert, and update, for schema A and schema B. One approach to ensure operability, in some embodiments, may be to ensure that SP 100 has more than enough privileges to provide sufficient access to any schemata and tables that the database program unit may reference; however, providing more privileges and more access than necessary may be problematic. In some embodiments, as a basis for the enhanced techniques disclosed herein, SP 100 may have its privileges restricted to have only sufficient access to only the relevant schemata and tables for each operation.

Although such access-control schemes have been contemplated, some approaches may be burdensome, as they potentially require a different "technical user" for each program unit, with each technical user having a custom role, security profile, and/or split privilege sets, introducing further management overhead. Granting permission to a particular user associated with an operation or database program unit to access a particular schema may not be sufficiently fine-grained, and may incur still further overhead in permissions management.

By contrast, using enhanced techniques including fine-grained SQL authorizations as described herein, operations may be designated in advance at creation of a given program unit, such as SP 100, or determined at runtime (call or execution of the given program unit) in some embodiments, that certain operations may require access only to some particular schemas and/or tables. In this way, by eliminating any need to micromanage technical users and/or roles, it becomes possible to maintain a high degree of security with considerably less ongoing overhead with respect to implementation and life cycle management for application developers and, in some cases, database administrators. Additional benefits of the enhanced techniques described herein will become apparent from the more detailed explanation below accompanying FIGS. 1-3 and Tables 1-4.

For example, referring to FIG. 1, a first set of operations 110 in SP 100 may only require access for the operations shown, in this particular case, SELECT for schema A, tables 1-3, and UPDATE for schema A, table 3. A second set of operations 120 may only require access for the operations shown, in this particular case, UPDATE for schema 3, SELECT for schema A, tables 3 and 4, and INSERT for schema A, table 5. Operations from the first set of operations 110 and the second set of operations 120 may overlap, as shown by the subset of operations 140 common to both the first set of operations 110 and the second set of operations 120. Specifically, in this example, the subset of operations 140 includes SELECT and UPDATE for schema A, table 3. Separately, a third set of operations 130 may include the operations shown, in this case, SELECT for schema B, table 6, and INSERT for schema B, table 7.

For an example case such as SP 100 of FIG. 1, privileges for just each set of operations (110, 120, 130) and/or each overlapping subset of operations (140) may be defined, designated, or determined in advance. One way to do this would be to associate each of 110, 120, and 130, if not also 140, with a unique technical user for each, with each technical user having an appropriate set of privileges defined elsewhere, such as in an access control list, group list, or other permissions model. Alternatively, a privilege set may be specified at creation of the database program unit, such as by special syntax. Additionally, or alternatively, a privilege set or privilege clause may be specified or determined at runtime, e.g., based on execution context, authentication protocols, configuration files, or other inputs. In some embodiments in which a privilege clause may be provided to specify a privilege set for a set of operations at creation of a program unit, for example, special syntax may be used as part of a language to be used for creating the program unit (e.g., SP 100). Additionally, or alternatively, in some embodiments, database scripting languages and/or SQL extensions may be used for this purpose.

For purely illustrative purposes, example syntax (pseudo code) is shown in Tables 1-4 herein. These examples are intended to show possible implementations of the enhanced techniques described herein, but are in no way intended to be limiting. Table 1 shows an example SP without fine-grained SQL authorization. Table 2 shows an example anonymous block without fine-grained SQL authorization. The anonymous block of Table 2 may be called and run from the SP of Table 1, or from within another program unit, for example. Table 3 shows an example SP with fine-grained SQL authorization, in accordance with some of the enhanced techniques described herein, according to some embodiments. Table 4 shows an example anonymous block with fine-grained SQL authorization, in accordance with some of the enhanced techniques described herein, according to some embodiments. The anonymous block of Table 4 may be called and run from the SP of Table 3, or from within another program unit, for example. In any case, for this example embodiment, the anonymous block of Table 4 would have a privilege set bound not only by its own privilege clause but also by the privilege set and any privilege clause of its calling program unit, which the anonymous block inherits. In other embodiments, such database program units may be implemented using other code, pseudocode, or algorithms, for example.

TABLE 1

```
CREATE PROCEDURE <proc_name> [(<parameter_clause>)]
    [LANGUAGE <lang>] [SQL SECURITY <mode>]
    [DEFAULT SCHEMA <default_schema_name>]
[READS SQL DATA ] AS
BEGIN [SEQUENTIAL EXECUTION]
<procedure_body>
END
```

TABLE 2

```
DO [(<parameter_clause>)]
BEGIN [SEQUENTIAL EXECUTION]
<body>
END
```

TABLE 3

```
CREATE PROCEDURE <proc_name> [(<parameter_clause>)]
    [LANGUAGE <lang>] [SQL SECURITY <mode>]
    [PRIVILEGES <privilege_clause>]
    [DEFAULT SCHEMA <default_schema_name>]
[READS SQL DATA ] AS
BEGIN [SEQUENTIAL EXECUTION]
<procedure_body>
END
```

TABLE 4

```
DO [(<parameter_clause>)]
    [SQL SECURITY <mode>]
    [PRIVILEGES <privilege_clause>]
BEGIN [SEQUENTIAL EXECUTION]
<body>
END
```

Although the examples of Tables 1-4 involve stored procedures and anonymous blocks, affected database program units are not limited to these examples. To provide additional non-limiting examples, for purposes of the enhanced techniques described herein, a database program unit may be any of a stored procedure, a package, a function, a library, a database trigger, a block, an anonymous block, or any other procedure, script, or piece of code that may be used with any kind of privilege management. Additionally, any of these types of database program units may be nested (included) within at least one other database program unit of any type, in which case, privilege requirements of the included units may be inherited. With respect to the enhanced techniques as applied to Table 3 and Table 4, inheritance may eliminate the need for explicit privilege clauses in nested database program units, further streamlining database program unit syntax.

As shown in FIG. 1, looking at SP 100 as a whole, it is apparent that SP 100 must access schemas A and B, tables 1-7, using SELECT, INSERT, and UPDATE operations. Applying implementations of the database program units of Table 1 or Table 2 (or both) to the example access requirements shown in FIG. 1, to ensure successful operation as intended, a developer may create the corresponding database program units with maximum privileges ensuring access to the tables of schema A and schema B, with SELECT, INSERT, and UPDATE privileges for the tables of schema A and schema B. This approach may be regarded as a pragmatic step to get a database program unit up and running, such as for development and/or testing, with minimal effort.

However, as a person of ordinary skill in the art may appreciate, such broad application of coarse-grained permissions may leave the database susceptible to unintended uses by some commands, such as with SQL injection, which may result in accidental or intentional compromise of sensitive information in the database. While use of fine-grained technical users and/or roles may be able to mitigate such vulnerability to some extent, this approach may incur significant costs in various forms, including overhead of management and maintenance, or breakage of database program units if the technical users/roles are not properly managed/maintained. This added layer of management and maintenance may further open a given system to unanticipated failure modes, requiring developers to consider more contexts than they ordinarily would plan for. Interdependency of roles and technical users with various operations and tables may further hamper ordinary lifecycle management.

Thus, as seen in Tables 3 and 4, a syntax-based approach for defining privilege sets, such as via a privilege clause, instead of or in addition to standard SQL security syntax, may allow for a more elegant solution that may reduce or eliminate other management overhead. As seen in Tables 3 and 4, a new element (with a PRIVILEGES keyword) may be added with a corresponding privilege clause in the syntax of a database program element, in some embodiments. This additional syntax may be parsed by a query execution engine (e.g., SQL execution engine) within a DBMS, or by a separate parser module, depending on specific implementation details of a given embodiment.

The body of the privilege clause may be specified in different ways, according to various embodiments, with or without syntactic sugar or additional keywords (beyond PRIVILEGES). In some embodiments, these privilege sets may be set according to predefined default security modes, e.g., "definer mode" or "caller mode" as may pertain to each database program unit and called instance, for example. Additionally, or alternatively, according to some embodiments, a privilege clause may be overridden and/or more explicitly define a privilege set of privilege elements that may be defined in terms of actual operations, schemas, and/or tables, e.g., definer.privilege=SELECT schema A.table 1, UPDATE schema B.table 1. In some embodiments, any such privilege clauses or similar as set forth in this paragraph may define what is referred to herein as a privilege envelope.

In some embodiments, use of roles and/or user-based access control or privilege sets may supplement the enhanced techniques described herein where appropriate depending on a given implementation. In such cases where roles are used concurrently with fine-grained SQL authorizations, such roles may be assigned by a database administrator, and applied to any privilege element within the DBMS, such as with a query execution engine. In some embodiments, the PRIVILEGES keyword may be defined or allowed for queries as well as database program units, while in other embodiments, the PRIVILEGES keyword may be disallowed depending on certain implementation details.

Some embodiments may involve more complexity in the implementation of the DBMS itself. Nonetheless, any resulting improvements in usability for application developers or database administrators may outweigh any added complexity, in terms of performance, value, and other metrics. Other advantages may be further apparent from discussion of some of the corresponding implementation details of the enhanced techniques described herein, as described further below with respect to FIG. 2.

Figure 2:
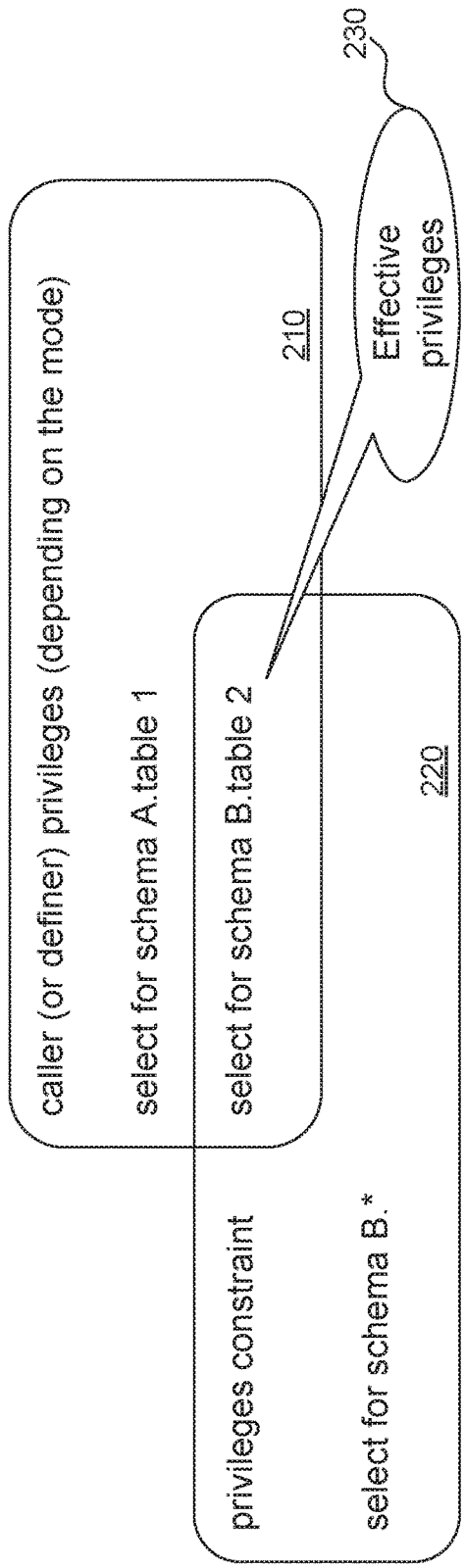
FIG. 2 is an example privilege envelope diagram for operations of database program units, according to some embodiments.

FIG. 2 is a privilege envelope diagram for operations of database program units, according to some embodiments. Specifically, the diagram of FIG. 2 shows privilege envelopes within a context of a database program unit 200, in which other database program units may be nested and which may have overlapping privilege sets. Other example configurations may be possible within the scope of the disclosure exemplified by FIG. 2.

The privilege envelope may define an additional constraint for the statements inside a database program unit. For example, a definer of a block may require privileges for SELECT, INSERT, and UPDATE for both schema A and B. But that block may also be defined with a privilege envelope, such as defined by an example privilege clause of SELECT for schema B.table 6, SELECT for schema B.table 7. Then the statements within this envelope will be constrained to these restricted privileges. These restricted privileges may also apply to another program unit nested in the block, e.g., an anonymous block with another privilege clause. The privilege set may then be additively combined for the nested anonymous block.

For example, privilege envelope 210 may define privileges depending on a mode, e.g., caller mode or definer mode. This envelope may result from a role being applied to operations of a database program unit as privilege elements (e.g., SELECT for schema A.table 1 and SELECT for schema B.table 2, as shown). Privilege envelope 220 may define privileges for a nested database program element, such as a sub-block, anonymous block, etc., which may require SELECT for the tables in schema B. However, because this nested unit (having privilege envelope 220) inherits from privilege envelope 210 in this example, it will not need access to tables of schema B not permitted in privilege envelope 210. Thus, the effective privileges 230 of privilege envelope 220, per the privilege constraint of its inheritance from privilege envelope 210, is only SELECT for schema B.table 2. As a result, a database program unit having privilege envelope 210 would not improperly inherit access to all tables of schema B, and vice-versa for privilege envelope 220 accessing schema A.

Effective privileges 230 thus may allow users to do precisely what they are allowed to do but not more. For example, a user who has privileges for SELECT for schema B, but who has no privileges for SELECT for schema A.table 1, may attempt SELECT for this table in caller mode. However, upon execution the call would result in an authorization error because the envelope can not provide the missing privileges, in some embodiments. Here, the error shows successful operation where the privilege envelopes are properly defined, disallowing unauthorized access.

Examples of where this may be useful include where users, modes, and roles pertain to business units within an organization. A logistics department within a company may not need to see all records for the accounting department, and vice-versa, although there may be some things in common that both may need similar access privileges to, and some records where the privileges may be unequal, for example. Any such configuration may be realized by application developers and database administrators using the intuitive, low-maintenance options afforded by a DBMS (query execution engine) implementation of the enhanced techniques described herein.

Although unauthorized access may be prevented in these examples, this is not to say that all forms of SQL injection are made impossible. However, the finer-grained controls enabled by the enhanced techniques described herein may further contribute to defense in depth, limiting scope and effects of any SQL injection that may technically succeed, by further limiting the amount of information that may be returned from a query, at least by limiting the possible number of sources of information that may be returned from the query.

As an additional example of privilege clause syntax for nested database program units, in some further embodiments, such syntax may be similar to that of GRANT statements, and may further describe inheritance relationships. Table 5 presents some illustrative examples:

TABLE 5

```
<system_privilege>[{, <system_privitege>}...] [WITH ADMIN
OPTION]
   | <source_privilege>[{, <source_privilege>}...] ON REMOTE
SOURCE <source_name> [WITH GRANT OPTION]
   | <schema_privilege>[{, <schema_privilege>}...] ON SCHEMA
<schema_name> [WITH GRANT OPTION]
   | <object_privilege>[{, <object_privilege>}...] ON <object_name>
[WITH GRANT OPTION]
   | <role_name>[{, <role_name>}...] [WITH ADMIN OPTION]
   | STRUCTURED PRIVILEGE <privilege_name>
```

Additional improvements may be realized in systems where dedicated roles may otherwise need to be attached to a procedure in definer mode, according to implementation details in some embodiments. In these such cases, as is implied by this need, necessary roles may not be available to be attached by a repository user, for example, or by a caller per se, in some embodiments. In such implementations, harmful effects to life cycle management are further compounded by the specialized technical user/role approach, and the benefits of the enhanced techniques described herein are therefore further pronounced.

The exemplary embodiments, arrangements, and configurations depicted in FIGS. 1 and 2 are not intended in any way to be limiting characterizations of the scope of the claims submitted herewith, but rather to describe by way of example the variety and flexibility of possible configurations with which the enhanced battery management techniques described herein may be implemented. Non-limiting examples of these enhanced techniques are further described in more detail via additional embodiments referencing figures described below. For example, method 300 of FIG. 3 shall be described with reference to any of FIGS. 1 and 2. However, method 300 is not limited to those example embodiments.

Figure 3:
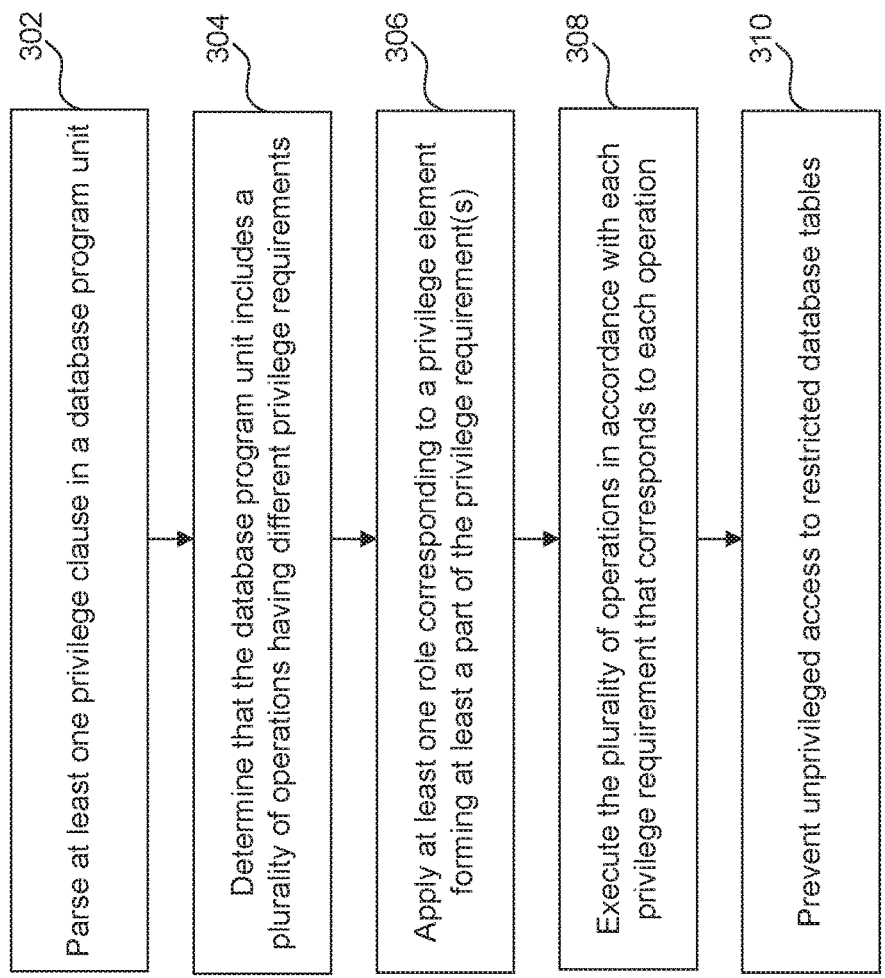
FIG. 3 is a flowchart illustrating a process for employing fine-grained SQL authorizations, according to some embodiments.

FIG. 3 is a flowchart illustrating a method 300 for employing fine-grained SQL authorizations, according to some embodiments.

Method 300 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the enhanced techniques of the disclosure provided herein. Further, some of the steps may be performed simultaneously, or in a different order from that shown in FIG. 3, as will be understood by a person of ordinary skill in the art.

In 302, at least one processor, such as processor 404, may parse at least one privilege clause in a database program unit. For example, a privilege clause may be defined in various forms of syntax in a database program unit. In other embodiments, the parsing may be for a comparable clause in a query instead of a database program unit, for example. The privilege clause may be deterministic and/or irreducible; other embodiments may involve various implementations of syntactic sugar.

In 304, a processor may determine that the database program unit includes a plurality of operations having different privilege requirements. One aspect of fine-grained SQL authorizations within database program units is the ability to leverage interplay between or among multiple operations in a given database program unit. Although adding a technical user and specific role for the privilege set of a single operation may be relatively trivial by itself, such workarounds may become quickly unmanageable as complexity is added in the form of multiple operations with multiple different privilege requirements and constraints. By implementing fine-grained SQL authorizations in accordance with the enhanced techniques described herein, advantages may be realized for database program units that include a plurality of operations having different privilege requirements.

In 306, a processor may apply at least one role corresponding to a privilege element forming at least part of the privilege requirements corresponding to a given operation, set of operations, or subset of operations within a database program unit (e.g., FIG. 1, elements 110, 120, 130, and 140; FIG. 2, elements 210, 220, and 230). In other embodiments, a preset configuration may be employed for automatic application of roles to corresponding privilege elements. A privilege element may form at least part of a first privilege requirement and a second privilege requirement.

In 308, a processor may execute the operations in accordance with each privilege requirement that corresponds to each operation. For example, execution in accordance with privilege requirements may include uneventful operation as expected, with authorized users accessing and manipulating data for which they have adequate privileges. Additionally, or alternatively, executing the plurality of operations in accordance with each privilege requirement that corresponds to each operation may include denying access to unauthorized data, entering an error state, and/or returning an error message. The above example of effective privileges 230 of the user who has privileges for SELECT for schema B, but who has no privileges for SELECT for schema A.table 1 (see FIG. 2). When such a user attempts a SELECT for this table in caller mode, a DBMS may enforce the privilege set or lack thereof, denying access and/or returning an authorization error as described above. This error state or denial of access, in some embodiments, may be understood to fulfill the requirements of 308.

In 310, a processor may prevent unprivileged access to restricted database tables. In some embodiments, this action may be implemented as an atomic part of 308, or it may be split out into a different action, such as with an error-handling mechanism, for example. Thus, the above example of effective privileges 230 of the user who has privileges for SELECT for schema B, but who has no privileges for SELECT for schema A.table 1 (see FIG. 2). When such a user attempts a SELECT for this table in caller mode, a DBMS may enforce the privilege set or lack thereof, in some embodiments, denying access and/or returning an authorization error as described above, thus preventing unprivileged access to restricted database tables (in this case, schema A.table 1). This action, in some embodiments, may be understood to fulfill the requirements of 310, if not also fulfilling the requirements of 308.

Figure 4:
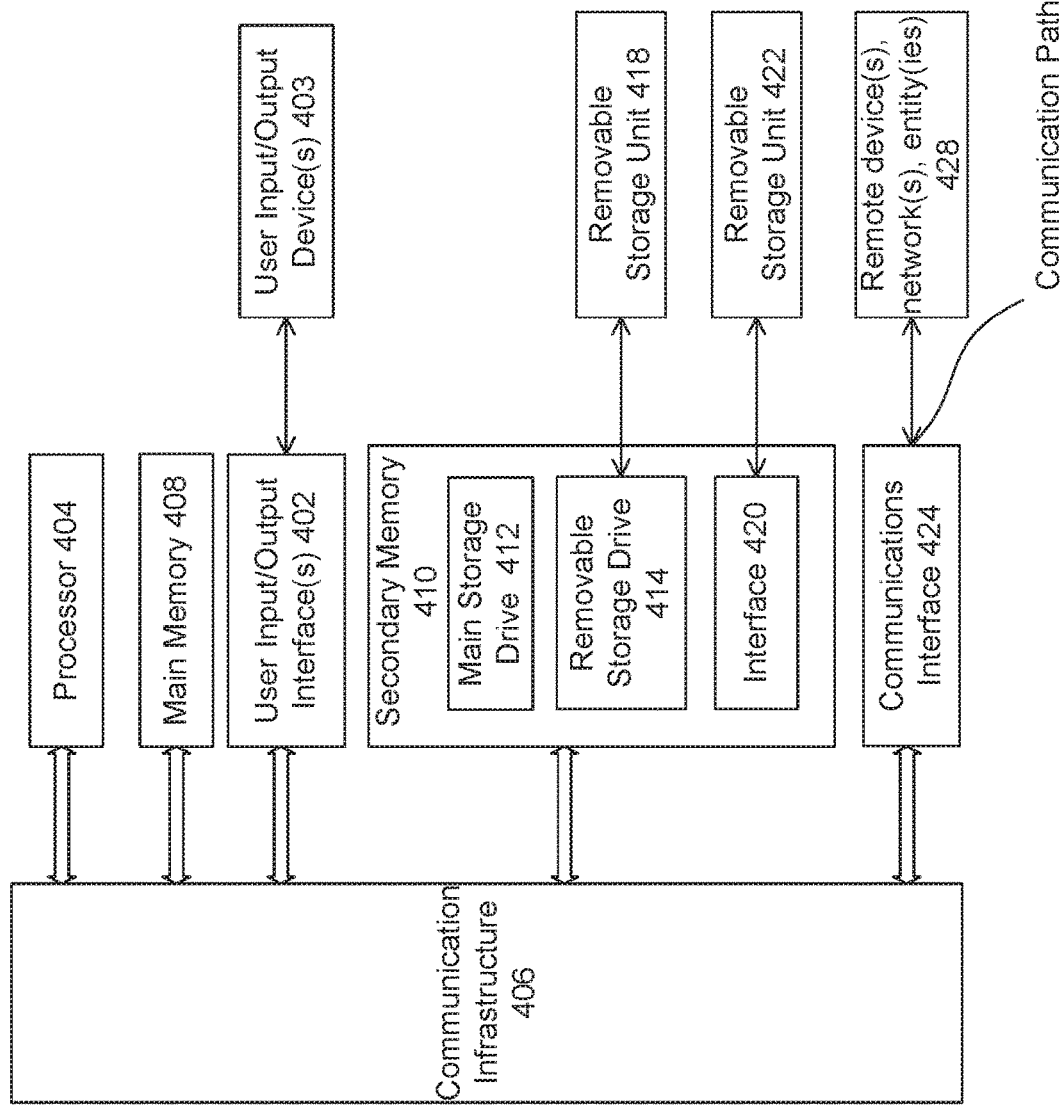
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a main storage drive 412 and/or a removable storage device or drive 414. Main storage drive 412 may be a hard disk drive or solid-state drive, for example. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communication path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUIS, AngularJS, Expressjs, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

I claim:

1. A computer-implemented method, comprising:
   determining, using at least one processor, via a database query execution engine, that a first database program unit comprises:
      a first plurality of operations, and
      a second database program unit that comprises a second plurality of operations, wherein:
         the second database program unit is nested in the first database program unit,
         at least one first operation of the first plurality of operations corresponds to a first privilege requirement,
         at least one second operation of the first plurality of operations corresponds to a second privilege requirement, and
         the first privilege requirement differs in scope from the second privilege requirement;
   executing, using the at least one processor, via the database query execution engine, the second plurality of operations of the second database program unit, in accordance with at least one corresponding privilege requirement, wherein the second database program unit inherits the at least one corresponding privilege requirement from the first database program unit; and
   executing, using the at least one processor, via the database query execution engine, the first plurality of operations of the first database program unit, in accordance with at least one of the first privilege requirement or the second privilege requirement,
wherein the first database program unit defines at least one privilege envelope from which at least one of the first privilege requirement or the second privilege requirement is derived, and
wherein the second database program unit inherits the at least one privilege requirement corresponding to the at least one privilege envelope.

2. The method of claim 1, wherein the determining further comprises:
parsing, using the at least one processor, at least one privilege clause defined in the first database program unit.

3. The method of claim 2, wherein the determining further comprises:
applying, using the at least one processor, at least one role corresponding to a privilege element,
wherein the privilege element forms at least part of at least one of the first privilege requirement the second privilege requirement.

4. The method of claim 1, wherein the first database program unit comprises at least one of a stored procedure, a package, a function, a library, a database trigger, a block, an anonymous block, or a combination thereof.

5. The method of claim 1, wherein the second database program unit is a stored procedure.

6. The method of claim 5, wherein the second plurality of operations comprises at least one SQL operation comprising SELECT, INSERT, or UPDATE; and wherein the second database program unit is a stored procedure.

7. A system, comprising:
a memory; and
at least one processor, coupled to the memory, and configured to:
make a determination, via a database query execution engine, that a first database program unit comprises:
a first plurality of operations, and
a second database program unit that comprises a second plurality of operations, wherein:
the second database program unit is nested in the first database program unit;
at least one first operation of the first plurality of operations corresponds to a first privilege requirement,
at least one second operation of the first plurality of operations corresponds to a second privilege requirement, and
the first privilege requirement differs in scope from the second privilege requirement;
execute, via the database query execution engine, the second plurality of operations of the second database program unit, in accordance with at least one corresponding privilege requirement, wherein the second database program unit inherits the at least one corresponding privilege requirement from the first database program unit; and
execute, via the database query execution engine, the first plurality of operations of the first database program unit, in accordance with at least one of the first privilege requirement or the second privilege requirement,
wherein the first database program unit defines at least one privilege envelope, from which at least one of the first privilege requirement and the second privilege requirement is derived, and from which the second database program unit inherits the at least one privilege requirement.

8. The system of claim 7, wherein to make the determination, the at least one processor is further configured to:
parse at least one privilege clause defined in the first database program unit.

9. The system of claim 8, wherein to make the determination, the at least one processor is further configured to:
apply at least one role corresponding to a privilege element,
wherein the privilege element forms at least part of at least one of the first privilege requirement the second privilege requirement.

10. The system of claim 7, wherein the first database program unit comprises at least one of a stored procedure, a package, a function, a library, a database trigger, a block, and an anonymous block, or a combination thereof.

11. The system of claim 7, wherein the second database program unit is a stored procedure.

12. The system of claim 11, wherein the second plurality of operations comprises at least one SQL operation comprising SELECT, INSERT, or UPDATE.

13. The system of claim 12, wherein the at least one corresponding privilege requirement as inherited is configured to prevent SQL injection.

14. A non-transitory computer-readable device having instructions stored thereon that, when executed by at least one computing device, cause the at least one computing device to perform actions comprising:
determining, via a database query execution engine, that a first database program unit comprises:
a first plurality of operations, and
a second database program unit that comprises a second plurality of operations, wherein:
the second database program unit is nested in the first database program unit;
at least one first operation of the first plurality of operations corresponds to a first privilege requirement,
at least one second operation of the first plurality of operations corresponds to a second privilege requirement, and
the first privilege requirement differs in scope from the second privilege requirement;
executing, via the database query execution engine, the second plurality of operations of the second database program unit, in accordance with at least one corresponding privilege requirement, wherein the second database program unit inherits the at least one corresponding privilege requirement from the first database program unit; and
executing, via the database query execution engine, the first plurality of operations of the first database program unit in accordance with at least one of the first privilege requirement or the second privilege requirement,
wherein the first database program unit defines at least one privilege envelope from which at least one of the first privilege requirement or the second privilege requirement is derived, and
wherein the second database program unit inherits the at least one privilege requirement corresponding to the at least one privilege envelope.

15. The non-transitory computer-readable device of claim 14, wherein the determining further comprises:
parsing at least one privilege clause defined in the first database program unit.

16. The non-transitory computer-readable device of claim 15, wherein the determining further comprises:
   applying at least one role corresponding to a privilege element,
   wherein the privilege element forms at least part of at least one of the first privilege requirement or the second privilege requirement.

17. The non-transitory computer-readable device of claim 14, wherein the first database program unit comprises at least one of a stored procedure, a package, a function, a library, a database trigger, a block, an anonymous block, or a combination thereof.

18. The non-transitory computer-readable device of claim 14, wherein the second database program unit is a stored procedure.

19. The non-transitory computer-readable device of claim 18, wherein the second plurality of operations comprises at least one SQL operation comprising SELECT, INSERT, or UPDATE.

20. The non-transitory computer-readable device of claim 19, wherein the at least one corresponding privilege requirement as inherited is configured to prevent SQL injection.

* * * * *